(12) United States Patent  
Al-Mahdawi

(10) Patent No.: US 8,570,172 B2  
(45) Date of Patent: Oct. 29, 2013

(54) RFID SYSTEM WITH DISTRIBUTED TRANSMITTERS

(75) Inventor: Tareef Ibrahim Al-Mahdawi, San Jose, CA (US)

(73) Assignee: Intelleflex Corporation, Santa Clara, CA (US)

( * ) Notice: Subject to any disclaimer, the term of this patent is extended or adjusted under 35 U.S.C. 154(b) by 2014 days.

(21) Appl. No.: 11/530,418

(22) Filed: Sep. 8, 2006

(65) Prior Publication Data

US 2008/0068174 A1    Mar. 20, 2008

(51) Int. Cl.
*G08B 13/14*    (2006.01)
*G06K 7/08*    (2006.01)

(52) U.S. Cl.
USPC .................... 340/572.1; 235/492; 340/572.7

(58) Field of Classification Search
USPC .......... 340/572.1–572.9, 10.3, 10.2; 235/451, 235/435, 492
See application file for complete search history.

(56) References Cited

U.S. PATENT DOCUMENTS

| | | | | |
|---|---|---|---|---|
| 6,333,703 | B1 * | 12/2001 | Alewine et al. | 340/995.13 |
| 6,657,586 | B2 | 12/2003 | Turner | 342/357.07 |
| 6,717,516 | B2 | 4/2004 | Bridgelall | 340/572.1 |
| 6,775,588 | B1 | 8/2004 | Peck | 700/214 |
| 6,853,294 | B1 | 2/2005 | Ramamurthy et al. | 340/10.1 |
| 6,888,459 | B2 | 5/2005 | Stilp | 340/541 |
| 7,284,703 | B2 * | 10/2007 | Powell et al. | 235/451 |
| 7,408,463 | B2 * | 8/2008 | Hammond et al. | 340/572.1 |
| 7,413,124 | B2 * | 8/2008 | Frank et al. | 235/451 |
| 7,423,516 | B2 * | 9/2008 | Overhultz | 340/10.5 |
| 7,616,113 | B2 * | 11/2009 | Ayachitula et al. | 340/539.13 |
| 7,619,529 | B2 * | 11/2009 | Goff et al. | 340/572.4 |
| 7,701,340 | B2 * | 4/2010 | Poasevara | 340/572.1 |
| 7,760,074 | B2 * | 7/2010 | Cato et al. | 340/10.1 |
| 7,834,765 | B2 * | 11/2010 | Sawyer | 340/572.4 |
| 8,125,316 | B2 * | 2/2012 | Moore | 340/10.4 |
| 2001/0040513 | A1 * | 11/2001 | McDonald | 340/825.49 |
| 2002/0055345 | A1 * | 5/2002 | Wood, Jr. | 455/277.1 |
| 2002/0126013 | A1 | 9/2002 | Bridgelall | 340/572.1 |
| 2002/0149483 | A1 * | 10/2002 | Shanks et al. | 340/572.1 |
| 2002/0181565 | A1 | 12/2002 | Boyd et al. | 375/152 |
| 2002/0196126 | A1 * | 12/2002 | Eisenberg et al. | 340/10.2 |
| 2004/0150521 | A1 | 8/2004 | Stilp | 340/545.1 |
| 2004/0153207 | A1 | 8/2004 | Peck | 700/214 |
| 2005/0040934 | A1 | 2/2005 | Shanton | 340/5.92 |
| 2005/0104719 | A1 | 5/2005 | Ramamurthy et al. | 340/10.1 |
| 2005/0110641 | A1 | 5/2005 | Mendolia et al. | 340/572.7 |
| 2005/0193149 | A1 | 9/2005 | Boyd | 709/248 |
| 2006/0145842 | A1 * | 7/2006 | Stilp | 340/539.22 |
| 2007/0159338 | A1 * | 7/2007 | Beber et al. | 340/572.8 |
| 2007/0206705 | A1 * | 9/2007 | Stewart | 375/316 |
| 2007/0257795 | A1 * | 11/2007 | Overhultz | 340/572.1 |
| 2008/0042838 | A1 * | 2/2008 | Levin et al. | 340/572.1 |
| 2008/0186180 | A1 * | 8/2008 | Butler et al. | 340/572.1 |
| 2010/0060432 | A1 * | 3/2010 | Van Niekerk et al. | 340/10.3 |

OTHER PUBLICATIONS

The International Preliminary Report on Patentability from PCT Application No. PCT/US2007/019508 mailed on Mar. 19, 2009.
International Search Report and Written Opinion from PCT Application No. PCT/US07/19508 mailed on Mar. 31, 2008.

* cited by examiner

*Primary Examiner* — Benjamin C Lee
*Assistant Examiner* — Sigmund Tang
(74) *Attorney, Agent, or Firm* — Zilka-Kotab, PC

(57) ABSTRACT

A Radio Frequency Identification (RFID) system according to one embodiment includes a reader having a receive antenna in communication therewith, and a plurality of transmitters in communication with the reader and spatially separated from the reader. Methods of use are also presented.

41 Claims, 4 Drawing Sheets

RFID SYSTEM WITH DISTRIBUTED TRANSMITTERS

FIELD OF THE INVENTION

The present invention relates to Radio Frequency Identification (RFID) systems and methods, and more particularly, this invention relates to RFID readers with a plurality of transmitters spatially separated therefrom.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates, much less find one particular carton of many.

Currently, retail items are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. However, Radio Frequency Identification (RFID) allows the physical layer of actual goods to automatically be tied into software applications, to provide accurate tracking.

The emerging RFID technology employs a Radio Frequency (RF) wireless link and ultra-small embedded computer chips, to overcome these barcode limitations. RFID technology allows physical objects to be identified and tracked via these wireless "tags". It functions like a bar code that communicates to the reader automatically without needing manual line-of-sight scanning or singulation of the objects.

A problem frequently encountered is that of "hot" tags. Because tags communicate with the reader by backscattering the carrier signal, those tags very close to a reader create a very strong backscatter that can interfere with communications between other tags and readers located far away. Two types of interference, or "jamming", are prevalent: forward link jamming and backscatter jamming. Consider a situation in which passive tag-1 is located 0.5 meters from Reader #1. The communications therebetween include the forward link from the reader to tag, and the backscatter signal from the tag to the reader. The maximum effective range of Reader #1 is 10 m. Passive tag-2 is located 10 meters from Reader #2. Readers #1 and #2 are located 200 meters apart. A "hot" tag-1 located only 0.5 meter from Reader #1 will generate backscatter 400 times greater at 0.5 m than it would at the 10 m maximum range of the reader, as calculated by (max range/actual distance)$^2$=(10/0.5)$^2$=400×. As will soon become apparent, tag-1 generates so much backscatter that it can jam communications between tag-2 and Reader #2, even though both tag-2 and Reader #2 are located 200 meters away from tag-1. In fact, for acceptable communications, Reader #2 would need to be located over 600 meters from tag-1 and/or Reader #1 based on square-law attenuation of RF energy over distance in free space, as calculated by the following equation:

$$D = a \times b \times (d2/d1) \qquad \text{Equation 1}$$

where:
  D is the distance between Reader #1 and Reader #2,
  a is the extra distance necessary to provide a minimum "tag-2 to tag-1 signal to noise ratio" of at least 10 db (which is a typical minimum ratio that allows tag-2 to successfully communicate with Reader #1) [value can vary depending on system and environmental situation],
  b is the maximum effective range of Reader #1,
  d2 is the distance between tag-2 and Reader #2, and
  d1 is the distance between tag-1 and Reader #1.

Performing the calculation, 3×10×(10/0.5)=600 meters. This is unacceptable in situations where multiple readers may be present in close proximity, as in a shopping mall. In the US, there are about 50 channels available to RFID systems. In Europe, there are currently only 10 channels. Accordingly, as RFID becomes more prevalent, readers will be using the same channels and will be using the same frequency, and the "hot tag" problem will become a serious issue that must be overcome.

Using long-range Class-3 tags and readers makes this "hot tag" problem even worse. For example, a "hot" Class-3 tag-3 located 0.5 m from Reader #3 running at a full 4 Watt (W) Effective Incident Radiated Power (EIRP) power can jam a Class-3 tag-4 located 100 meters from Reader #4 at a range of 60,000 meters in free space, where D=3×100×(100/0.5)=60,000 meters. In English units, this "hot tag" can jam every reader operating in its channel at a range of up to 40 miles away (in free space).

One proposed solution is to have the tag detect its own incident power. If the tag detects a strong signal, it will attenuate its own backscatter. However, this adds complexity and cost to each and every tag, making it cost prohibitive.

What is needed is a cost effective and efficient way to both dramatically reduce the severity of the hot tag backscatter problem and also reduce reader-to-reader interference in the forward link as well.

SUMMARY OF THE INVENTION

A Radio Frequency Identification (RFID) system according to one embodiment includes a reader having a receive antenna in communication therewith, and a plurality of transmitters in communication with the reader and spatially separated from the reader.

The receive antenna may be located in close proximity to the reader.

In one configuration, none of the transmitters that are actively functioning are positioned in close proximity to the reader.

In one embodiment, a first portion of the transmitters transmit in a first frequency simultaneously with a second portion of the transmitters transmitting in a second frequency. As an option, the first and second portions of the transmitters transmit to RFID tags simultaneously. As another option, the first and second portions of the transmitters hop frequencies at about a same time.

The reader may be in communication with several transmitters, e.g., 10, 25, or more.

The reader may communicate with the transmitters via wired or wireless connection.

A transmission power of each of the transmitters is preferably less than about 100 milliwatts, and more preferably, continuously less than about 10 milliwatts.

The transmitters may or may not be able to receive a backscattered RF signal.

Each of the transmitters may be separately controllable.

A method according to another embodiment of the present invention enables locating RFID tags utilizing a system having a reader with a receive antenna coupled thereto and a plurality of transmitters in communication with the reader and spatially separated from the reader, including systems such as that described above. The method includes instructing at least one of the transmitters to transmit a signal, listening for a backscattered signal from a particular transponder, estimating a location of the particular transponder if a backscattered signal from the particular transponder is received, and instructing at least another of the transmitters to transmit a signal if no backscattered signal from the particular transponder is received.

As an option, additional transmitters may be instructed to transmit a signal if a backscattered signal from the particular transponder is received, upon which the reader listens for a backscattered signal from a particular transponder, where the backscattered signals are analyzed during estimating the location of the particular transponder.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag.

Figure 1A:
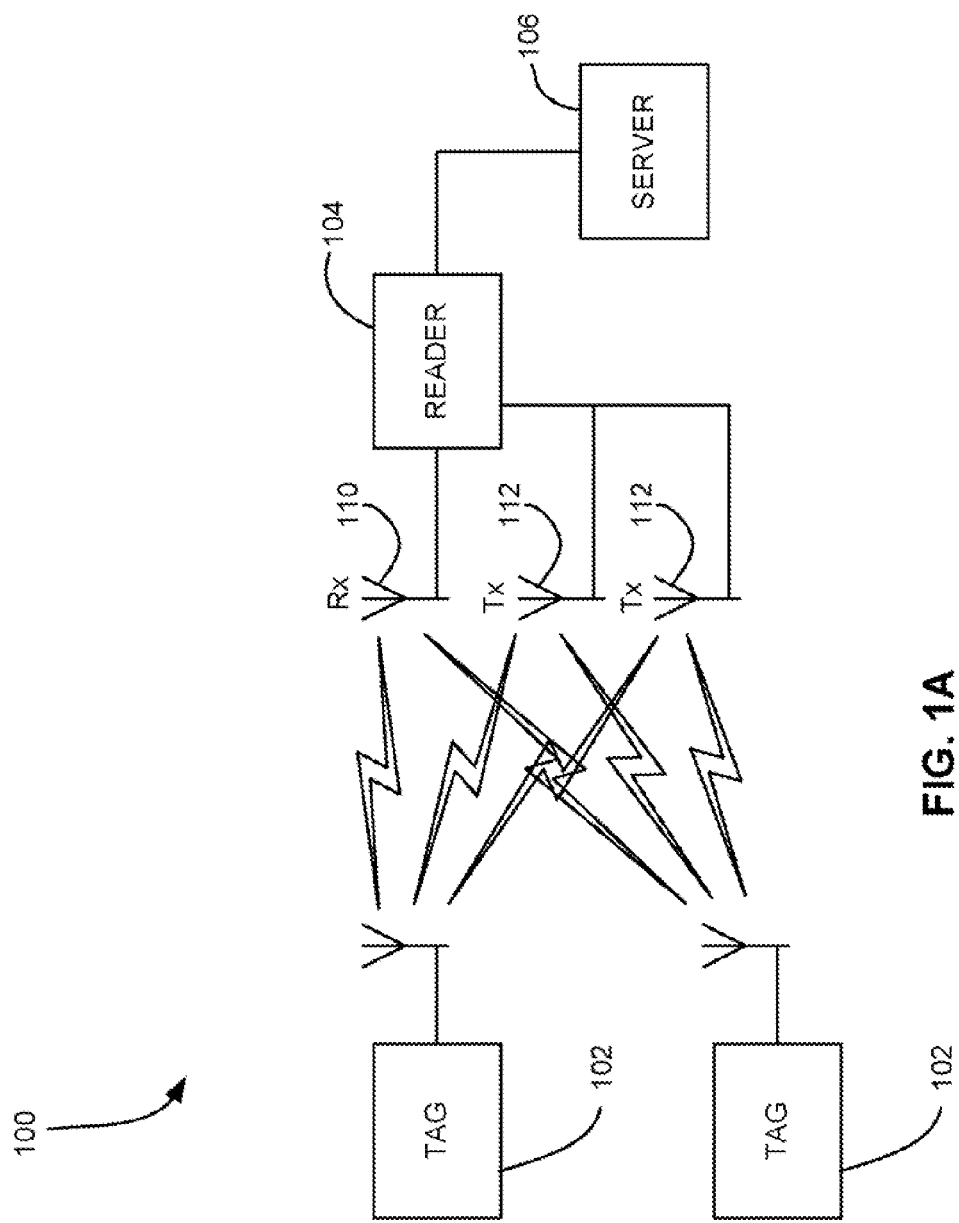
FIG. 1A is a system diagram of an RFID system according to one embodiment of the present invention.

As shown in FIG. 1A, an RFID system 100 according to one embodiment of the present invention includes RFID tags 102, an interrogator or "reader" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the reader 104. The chip may also include a power supply circuit to extract and regulate power from the RF reader; a detector to decode signals from the reader; a backscatter modulator, a transmitter to send data back to the reader; anti-collision protocol circuits; and at least enough memory to store its unique identification code, e.g., Electronic Product Code (EPC).

The EPC is a simple, compact identifier that uniquely identities objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifiers) or reference key(s).

Communication begins with a reader 104 sending out signals via radio wave to find a tag 102. When the radio wave hits the tag 102 and the tag 102 recognizes and responds to the reader's signal, the reader 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds. One illustrative application of ultra high-frequency tags is automated toll collection on highways and interstates.

With continued reference to FIG. 1A, it is seen that the reader 104 has a receive antenna (Rx) 110 in communication therewith, and a plurality of transmitters (Tx) 112 in communication with the reader 104. The receive antenna 110 may or may not be located in close proximity to the reader, e.g., within about 2 feet, while the transmitters 112 are preferably spatially separated from the reader, e.g., greater than about 2 feet away. A benefit of having the transmitters 112 positioned far from the reader is that the reader receiving circuitry will have improved sensitivity because it is not co-located with the carrier wave transmitter.

Note that one of the transmitters 112 could be in close proximity to the reader, while the rest of the transmitters are positioned farther away.

An RFID system according to a preferred embodiment is an RFID system with the reader transmitter decentralized, and the transmit function is implemented using distributed low power transmitters. The result is a system which illuminates the site with significantly less RF power than conventional systems and provides the ability to locate tags by proximity to one or more of the distributed transmitters.

Figure 1B:
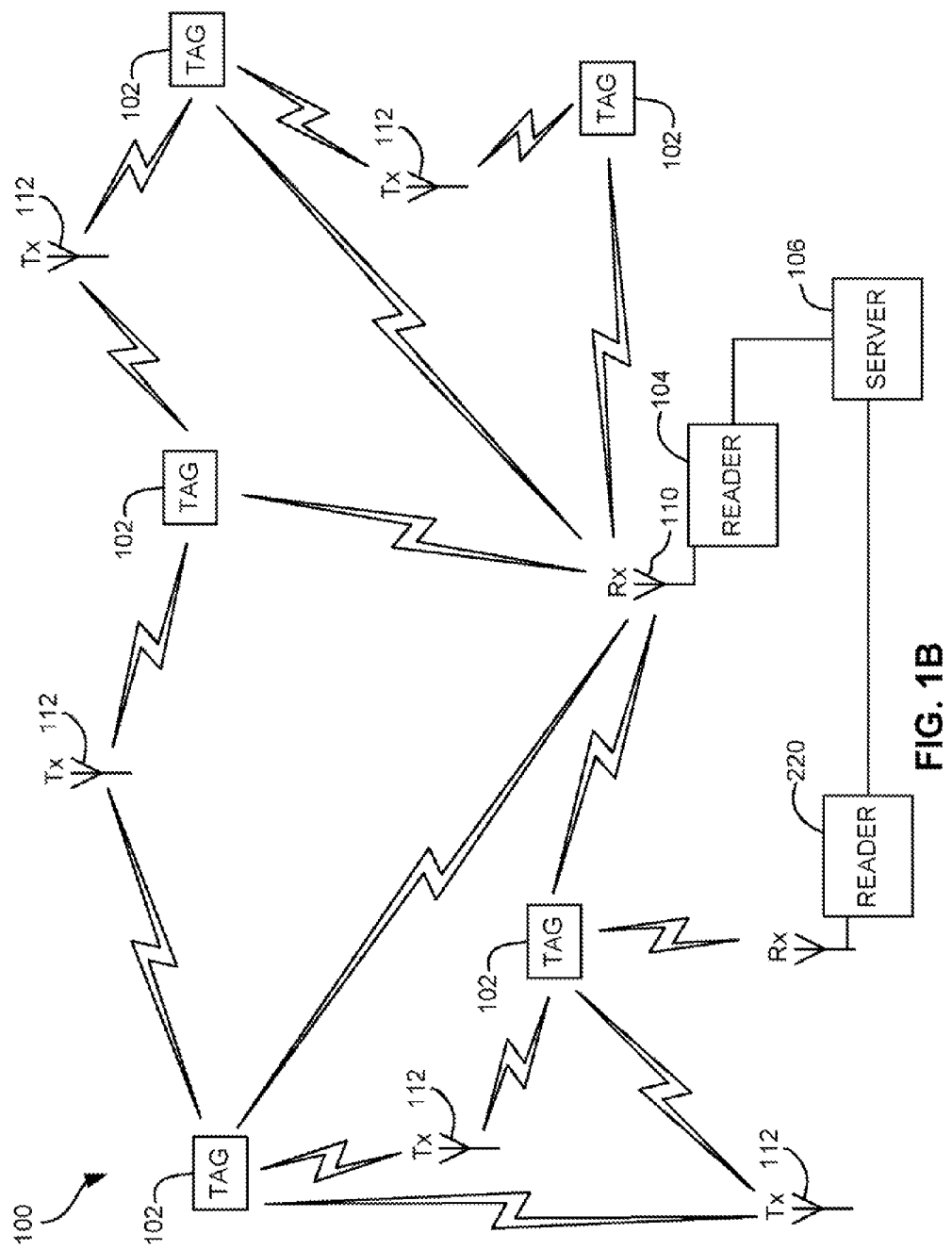
FIG. 1B is a system diagram of an RFID system according to one embodiment of the present invention.

FIG. 1B illustrates an embodiment 100 in which none of the transmitters 112 that are actively functioning are positioned in close proximity to the reader 104, while the receive antenna 110 is adjacent to the reader. RFID tags 102 to be identified and/or located are also present. An optional second reader 120 is also shown. The second reader 120 may share duties with the first reader 104, function autonomously, etc., and may or may not be in communication with some or all of the various transmitters 112.

The transmitters 112 are preferably distributed close to where the tags 102 are located such that many if not all tags 102 have one of the transmitters 112 within a close proximity. For example, a transmitter 112 can be placed above each shelf or section in a large warehouse.

The forward link from the reader 104 operates by sending commands from the reader 104 to one or more selected transmitters 112, which may include all transmitters 112. The commands from the reader 104 to the transmitters 112 may be protocol compliant, with the transmitters 112 merely broadcasting the command. Alternatively, the transmitters 112 may convert commands from the reader 104 into protocol compliant commands readable by the tags 102.

The forward link from the transmitters 112 to the tags 102 operates by sending protocol compliant commands from the distributed transmitters 112 to the tags 102.

Multiple transmitters may operate simultaneously in an installation environment by using different frequencies. The frequency and/or sorting out tag responses can be synchronized by the central reader. In one embodiment, a first portion of the transmitters transmit in a first frequency while a second portion of the transmitters transmit in a second frequency. Likewise, even more granularity is possible, e.g., a third set of transmitters transmits in a third frequency, a fourth set transmits in a fourth frequency, etc. In one mode of operation, each transmitter may transmit in a unique frequency. As an option, the first and second portions of the transmitters transmit to RFID tags simultaneously, in the same or different frequencies. As another option, the first and second portions of the transmitters may hop frequencies at about the same time. Thus, each of the transmitters, or groups thereof, may be separately controllable.

The reader may transmit certain data to one or more selected transmitters instead of transmitting the data in all channels. For example, where the locations of the transmitters are known, only transmitters in a first geographical area may transmit a first string of data, while transmitters in a second geographical area transmit a second string of data. Such operations may be performed simultaneously. Also, the geographical areas may or may not overlap, and may be based on a known or expected location of a given tag.

As mentioned above, the transmitters preferably transmit at low power. The RFID system is able to operate with significantly lower radiated RF power because of the proximity of the distributed transmitters to the tags. The ability to operate with low power transmissions provides several advantages. One advantage is that the "hot tag" problem mentioned above is minimized. Another benefit is that propagation of the signal is minimized. A transmission power of each of the transmitters is preferably less than about 100 milliwatts, and more preferably, continuously less than about 10 milliwatts. Even at these low power levels, the inventor expects about a 30 dB improvement in Class-3 tag average response signals.

The reverse link (tag to reader) preferably operates on the principle of sending a continuous wave (CW) carrier from the transmitters to the tags, where the carrier is modulated by a tag backscatter operation. The data from the tag is transferred to the receive antenna of the reader via this scatter modulation. In other words, the tags transmit directly to the reader. A configuration where the receive antenna is in close proximity to the reader provides the benefits of low power transmissions and low cost as only one receive path may be required.

In a variation, the transmitters may receive the backscattered signal, though such a system would be much more complex and require bidirectional links between the reader and transmitters.

The reader communicates with several transmitters, e.g., 10, 25, or more. The link between the reader and the transmitters can be either wired or wireless. If wireless, the reader may have a transmitting antenna dedicated to transmitting solely to the transmitters, serving the dual function of transmitting to the transmitters and transmitting to tags, etc. Any suitable wireless protocol may be used, including RFID protocols, wireless networking protocols such as IEEE 802.11 (a/b/g), BLUETOOTH compliant protocols, etc. In a wired link configuration, unidirectional or bidirectional wires and any suitable communications protocol may be used.

The system is preferably operated in conjunction with battery assisted tags, which are able to reply to weak transmission signals. This allows the transmission power of each transmitter to be set to a very low level. However, the system may also be used with passive tags. With any of the embodiments described herein, there is no need to change the tag design to operate with the system.

Figure 2:
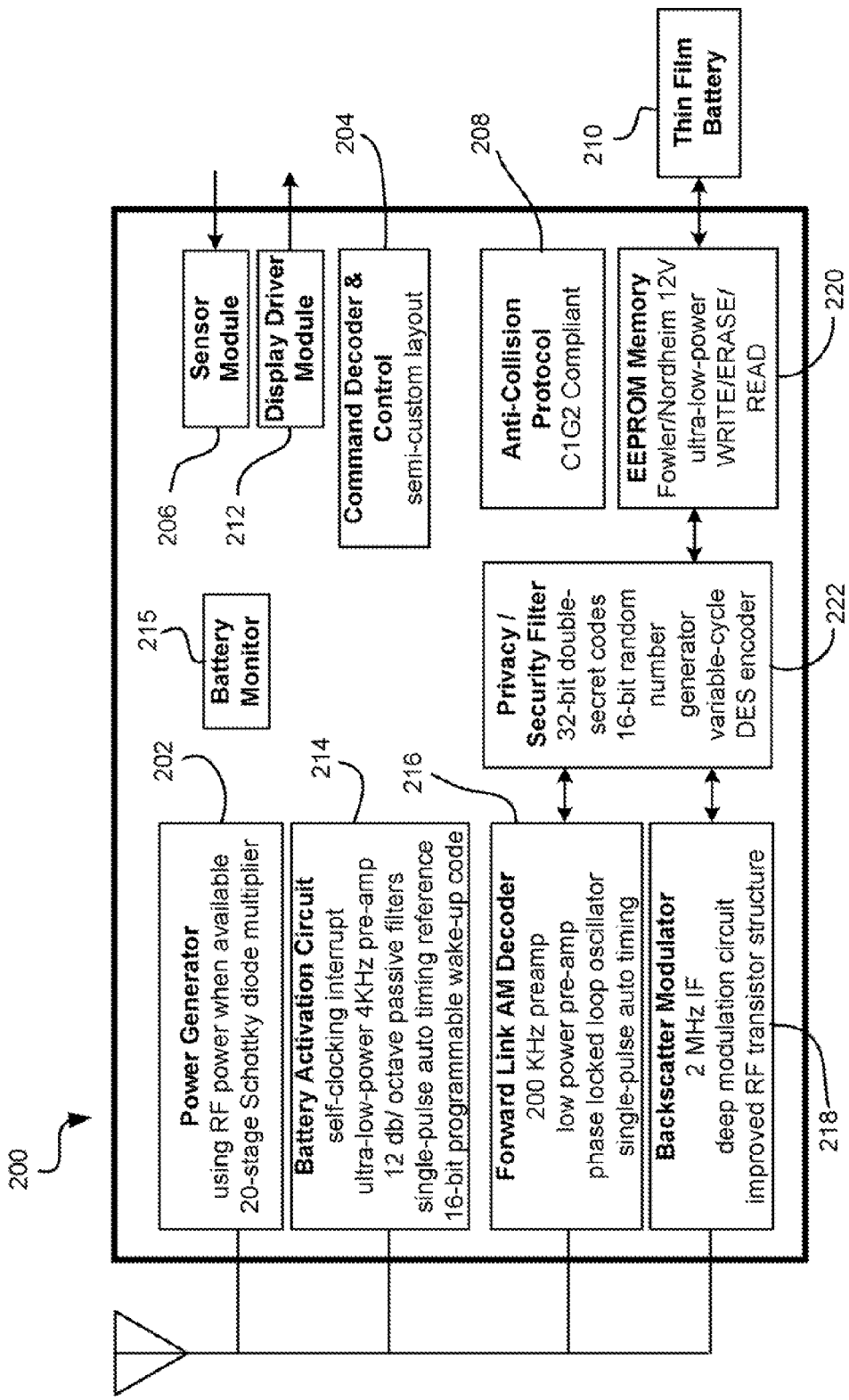
FIG. 2 is a system diagram for an integrated circuit (IC) chip for implementation in an RFID tag.

Embodiments of the present invention are preferably implemented in a Class-3 or higher Class chip, which typically contains the control circuitry for most if not all tag operations. FIG. 2 depicts a circuit layout of a Class-3 chip 200 and the various control circuitry according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the reader can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with readers, etc. can be used.

Only six connection pads (not shown) are required for the illustrative chip 200 of FIG. 2 to function: Vdd to the battery, ground, plus two antenna leads to support multi-element omni-directional and isotropic antennas. Sensors to monitor temperature, shock, tampering, etc. can be added by appending an industry-standard I²C or SPI interface to the core chip.

It should be kept in mind that the present invention can be implemented using any type of tag, and the circuit 200 described above is presented as only one possible implementation.

Many types of devices can take advantage of the embodiments disclosed herein, including but not limited to RFID systems and other wireless devices/systems. To provide a context, and to aid in understanding the embodiments of the invention, much of the present description has been presented in terms of an RFID system such as that shown in FIGS. 1A-1B. It should be kept in mind that this is done by way of example only, and the invention is not to be limited to RFID systems, as one skilled in the art will appreciate how to implement the teachings herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Any of embodiments of the present invention described above may be implemented in an accurate zonal location system for RFID tags.

Figure 3:
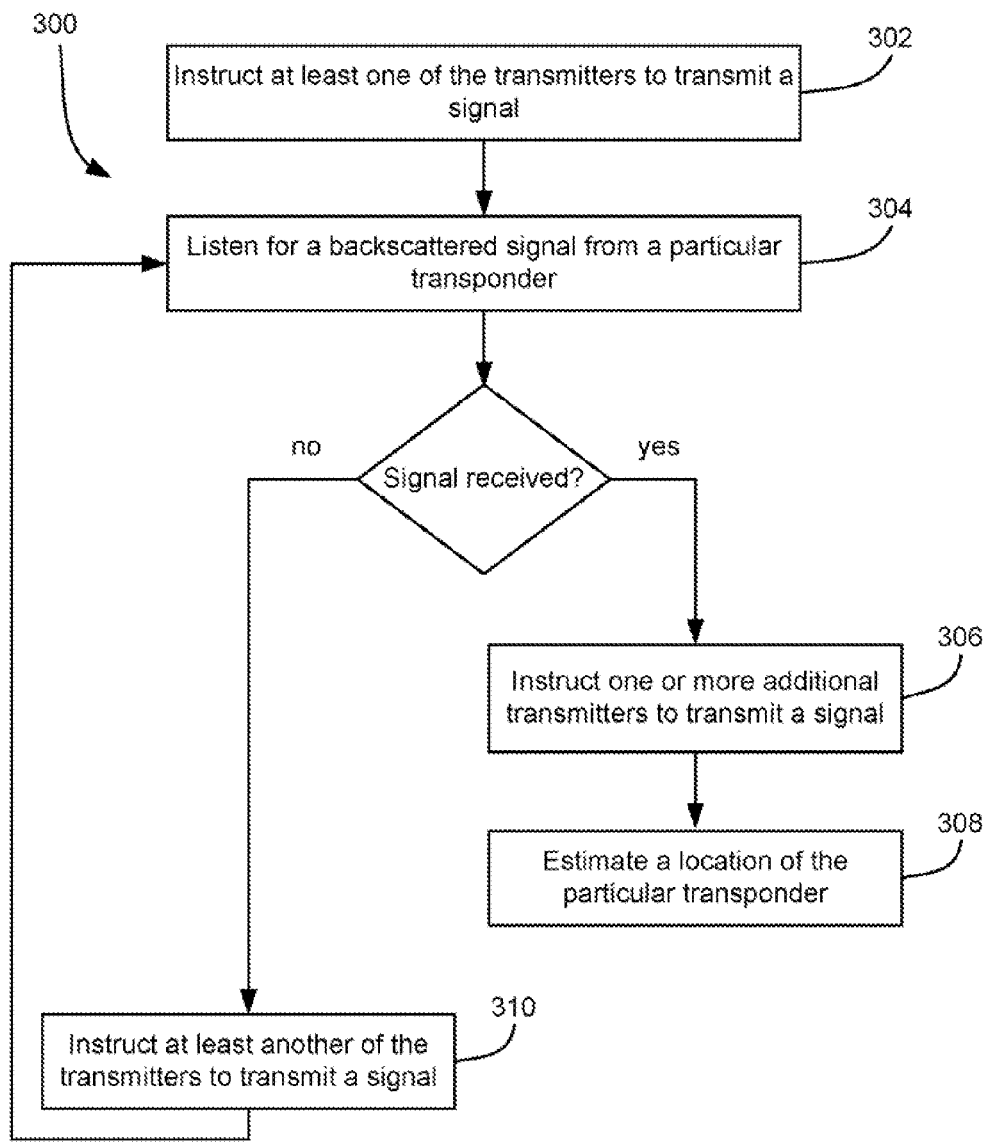
FIG. 3 is a process diagram of a method for locating an RFID tag according to one embodiment of the present invention.

FIG. 3 illustrates a method 300 for locating an RFID tag utilizing a system having a reader with a receive antenna coupled thereto and a plurality of transmitters in communication with the reader and spatially separated from the reader, including systems such as those described above. In operation 302, at least one of the transmitters is instructed to transmit a signal. As implied, individual transmitters may sequentially/semi-randomly transmit a signal, groups of transmitters may transmit a signal, and/or all transmitters may transmit a signal. In operation 304, the system listens for a backscattered signal from a particular transponder (e.g., RFID tag). The particular transponder can be identified by its unique identification number or some other known characteristic. As an option, in operation 306, one or more transmitters, preferably in the vicinity of the transmitters that caused the tag to backscatter, or perhaps a subset thereof, may be instructed to transmit a signal if a backscattered signal from the particular transponder is received, upon which the reader listens for a backscattered signal from a particular transponder. The backscattered signal(s) may then be analyzed during estimating the location of the particular transponder.

In operation 308, a location of the particular transponder is estimated if a backscattered signal from the particular transponder is received. The location of the transponder can be estimated in many ways. Relatively simple algorithms can be used to identify the location of the tags based on the location of the transmitters. For example, the system may use triangulation based on the strength of a signal backscattered by the tag from two or more transmitters. Less accurately, the system may identify which transmitter was able to operate the transponder.

Because the transmitters are operating at low power, occasions might occur where no backscatter is received after a transmission from a particular transmitter or group of transmitters. In that case, in operation 310, at least another of the transmitters is instructed to transmit a signal if no backscattered signal from the particular transponder is received.

One skilled in the art will appreciate how the systems and methods presented herein can be applied to a plethora of scenarios and venues, including but not limited to automotive yards, warehouses, construction yards, retail stores, boxcars and trailers, etc. Accordingly, it should be understood that the systems and methods disclosed herein may be used with objects of any type and quantity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) system, comprising:
 a reader having at least one receive antenna in communication therewith; and
 a plurality of transmitters in communication with the reader and spatially separated from the reader,
 wherein the transmitters broadcast commands received from the reader or converted from commands received from the reader,
 wherein the at least one receive antenna receives replies directly from the transponders performing a backscatter operation on a carrier transmitted from at least one of the transmitters,
 wherein more of the transmitters are in communication with the reader than-the at least one receive antenna,
 wherein the at least one receive antenna is proximally closer to the reader than the transmitters.

2. A system as recited in claim 1, wherein the at least one receive antenna is located in close proximity to the reader, wherein the transmitters are located greater than about 2 feet away from the reader, wherein more of the transmitters are in communication with the reader than at least one receive antenna.

3. A system as recited in claim 1, wherein none of the transmitters that are actively functioning are positioned in close proximity to the reader.

4. A system as recited in claim 1, wherein a first portion of the transmitters transmit in a first frequency simultaneously with a second portion of the transmitters transmitting in a second frequency that is different than the first frequency.

5. A system as recited in claim 4, wherein the first and second portions of the transmitters hop frequencies at about a same time, wherein the first portion of the transmitters are configured to transmit in a third frequency that is different than the first and second frequencies simultaneously with the second portion of the transmitters transmitting in a fourth frequency that is different than the first, second and third frequencies.

6. A system as recited in claim 1, wherein a first portion of the transmitters in a first geographical area transmit a first string of data, wherein a second portion of the transmitters in a second geographical area different than the first geographical area transmit a second string of data.

7. A system as recited in claim 1, wherein the reader is in communication with at least 10 transmitters.

8. A system as recited in claim 1, wherein the reader is in communication with at least 25 transmitters.

9. A Radio Frequency Identification (RFID) system, comprising:
 a reader having at least one receive antenna in communication therewith; and
 a plurality of transmitters in communication with the reader and spatially separated from the reader, wherein the transmitters broadcast commands received from the reader or converted from commands received from the reader,
 wherein the reader communicates with the transmitters directly via a wired connection,
 wherein the receive antenna receives replies directly from transponders responding to a signal from any of the transmitters,
 wherein the at least one receive antenna is proximally closer to the reader than the transmitters,
 wherein more of the transmitters are in communication with the reader than the at least one receive antenna.

10. A system as recited in claim 1, wherein the reader communicates with the transmitters via wireless connection.

11. A system as recited in claim 1, wherein a transmission power of each of the transmitters is less than about 100 milliwatts.

12. A system as recited in claim 1, wherein a transmission power of each of the transmitters is continuously less than about 10 milliwatts.

13. A system as recited in claim 1, wherein the transmitters are unable to receive a backscattered RF signal for sending the backscattered signal to the reader.

14. A Radio Frequency Identification (RFID) system, comprising:
- a reader having at least one receive antenna coupled thereto and in close proximity therewith; and
- a plurality of transmitters in communication with the reader and spatially separated from the reader, each of the transmitters being separately controllable, the transmitters being unable to process a received backscattered RF signal, wherein the transmitters broadcast commands received from the reader or converted from commands received from the reader,
- wherein the at least one receive antenna receives replies directly from transponders responding to a signal from any of the transmitters,
- wherein the at least one receive antenna is proximally closer to the reader than the transmitters,
- wherein more of the transmitters are in communication with the reader than the at least one receive antenna.

15. A system as recited in claim 14, wherein none of the transmitters that are actively functioning are positioned in close proximity to the reader, wherein the transmitters that are actively functioning are located greater than about 2 feet away from the reader, wherein the at least one receive antenna receives replies directly from transponders performing a backscatter operation on a carrier transmitted from at least one of the transmitters.

16. A system as recited in claim 14, wherein a first portion of the transmitters transmit in a first frequency simultaneously with a second portion of the transmitters transmitting in a second frequency.

17. A system as recited in claim 16, wherein the first and second portions of the transmitters hop frequencies at about a same time, wherein the first portion of the transmitters are configured to transmit in a third frequency that is different than the first and second frequencies simultaneously with the second portion of the transmitters transmitting in a fourth frequency that is different than the first, second and third frequencies.

18. A system as recited in claim 14, wherein a first portion of the transmitters in a first geographical area transmit a first string of data, wherein a second portion of the transmitters in a second geographical area different than the first geographical area transmit a second string of data.

19. A system as recited in claim 14, wherein the reader is in communication with at least 10 transmitters.

20. A system as recited in claim 14, wherein the reader is in communication with at least 25 transmitters.

21. A system as recited in claim 14, wherein the reader communicates with the transmitters via wired connection.

22. A system as recited in claim 14, wherein the reader communicates with the transmitters via wireless connection.

23. A system as recited in claim 14, wherein a transmission power of each of the transmitters is less than about 100 milliwatts.

24. A system as recited in claim 14, wherein a transmission power of each of the transmitters is continuously less than about 10 milliwatts.

25. A method for locating a Radio Frequency Identification (RFID) tag utilizing a system having a reader with at least one receive antenna coupled thereto and a plurality of transmitters in communication with the reader and spatially separated from the reader, the method comprising:
- instructing at least one of the transmitters to transmit a signal;
- listening for a backscattered signal from a particular transponder while the at least one of the transmitters transmits;
- estimating a location of the particular transponder when a backscattered signal from the particular transponder is received; and
- instructing at least another of the transmitters to transmit a signal when no backscattered signal from the particular transponder is received when the at least one of the transmitters transmits,
- wherein the at least one receive antenna is proximally closer to the reader than the transmitters,
- wherein more of the transmitters are in communication with the reader than the at least one receive antennas.

26. A method as recited in claim 25, further comprising instructing additional transmitters to transmit a signal if a backscattered signal from the particular transponder is received, and listening for a backscattered signal from a particular transponder, wherein the backscattered signals are analyzed during estimating the location of the particular transponder.

27. A method as recited in claim 25, wherein the transmitters are unable to receive a backscattered RF signal for sending the backscattered signal to the reader.

28. A method as recited in claim 25, wherein a first portion of the transmitters transmit in a first frequency simultaneously with a second portion of the transmitters transmitting in a second frequency.

29. A method as recited in claim 28, wherein the first and second portions of the transmitters transmit to RFID tags simultaneously.

30. A method as recited in claim 25, wherein a transmission power of each of the transmitters is less than about 100 milliwatts.

31. A method as recited in claim 25, wherein a transmission power of each of the transmitters is continuously less than about 10 milliwatts.

32. A method as recited in claim 25, wherein the backscattered signal from the particular transponder is in response to the signal transmitted by the at least one of the transmitters.

33. The system as recited in claim 1, wherein the transmitters broadcast commands converted from commands received from the reader, wherein the commands received from the reader are not compliant with an RFID protocol, and wherein the commands converted from the reader commands are compliant with an RFID protocol.

34. The system as recited in claim 1, wherein the reader and/or the transmitters are configured to cause the transmitters to transmit simultaneously at a unique frequency that is different than the frequencies at which the other transmitters transmit.

35. The system as recited in claim 1, wherein the reader and/or the transmitters are configured to cause the transmitters to transmit simultaneously, each on a unique frequency that is different than the frequencies at which the other transmitters transmit.

36. The system as recited in claim 14, wherein the transmitters broadcast commands converted from commands received from the reader, wherein the commands received from the reader are not compliant with an RFID protocol, and wherein the commands converted from the reader commands are compliant with an RFID protocol.

37. The system as recited in claim 14, wherein the reader and/or the transmitters are configured to cause the transmitters to transmit simultaneously at a unique frequency that is different than the frequencies at which the other transmitters transmit.

38. The system as recited in claim 14, wherein the reader and/or the transmitters are configured to cause the transmitters to transmit simultaneously, each on a unique frequency that is different than the frequencies at which the other transmitters transmit.

39. The system as recited in claim 14, wherein the at least one receive antenna is proximally closer to the reader than the transmitters.

40. The system as recited in claim 2, wherein none of the transmitters that are actively functioning are positioned in close proximity to the reader,
   wherein each transmitter transmits at a unique frequency that is different than the frequencies at which the other transmitters transmit,
   wherein the transmitters hop frequencies about simultaneously,
   wherein a first portion of the transmitters in a first geographical area transmit a first string of data, wherein a second portion of the transmitters in a second geographical area different than the first geographical area transmit a second string of data,
   wherein the reader is in communication with at least 10 transmitters,
   wherein the reader communicates with the transmitters via a wired connection,
   wherein a transmission power of each of the transmitters is less than about 100 milliwatts,
   wherein more of the transmitters are in communication with the reader than receive antennas,
   wherein the transmitters are unable to receive a backscattered RF signal for sending the backscattered signal to the reader.

41. The system as recited in claim 15, wherein each transmitter transmits at a unique frequency that is different than the frequencies at which the other transmitters transmit,
   wherein the transmitters hop frequencies about simultaneously, wherein a first portion of the transmitters in a first geographical area transmit a first string of data,
   wherein a second portion of the transmitters in a second geographical area different than the first geographical area transmit a second string of data, wherein the reader is in communication with at least 10 transmitters,
   wherein the reader communicates with the transmitters via wired connection,
   wherein a transmission power of each of the transmitters is less than about 100 milliwatts,
   wherein the at least one receive antenna receives replies directly from transponders performing a backscatter operation on a carrier transmitted from at least one of the transmitters,
   wherein the transmitters are unable to receive a backscattered RF signal for sending the backscattered signal to the reader.

\* \* \* \* \*

UNITED STATES PATENT AND TRADEMARK OFFICE
CERTIFICATE OF CORRECTION

PATENT NO. : 8,570,172 B2  
APPLICATION NO. : 11/530418  
DATED : October 29, 2013  
INVENTOR(S) : Tareef Ibrahim Al-Mahdawi Page 1 of 1

It is certified that error appears in the above-identified patent and that said Letters Patent is hereby corrected as shown below:

In the specification:

col. 1, line 16 replace "hands" with --bands--;

col. 4, line 40 replace "identities" with --identifies--.

Signed and Sealed this  
Eleventh Day of February, 2014

Michelle K. Lee  
*Deputy Director of the United States Patent and Trademark Office*